Nov. 10, 1931. T. TALIANI 1,831,725
ROAD INDICATOR FOR MOTOR CARS AND THE LIKE
Filed July 21, 1930
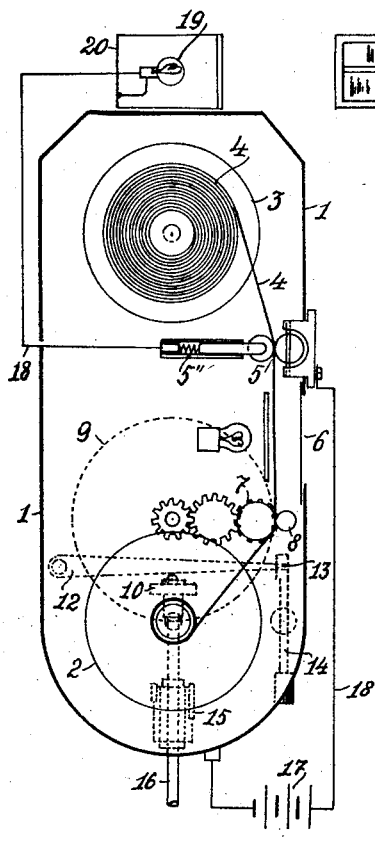
T. Taliani
INVENTOR
By: Marks & Clerk
ATTYS Patented Nov. 10, 1931

1,831,725

UNITED STATES PATENT OFFICE

TOMMASO TALIANI, OF ROME, ITALY

ROAD INDICATOR FOR MOTOR CARS AND THE LIKE

Application filed July 21, 1930, Serial No. 469,589, and in Italy January 10, 1930.

The object of the invention is an automatically working device which is intended to serve as an indicator and guide on motor cars and also on railway engines and the like.

The device comprises the usual paper or like strip which unwinds in synchronism with the route travelled, for example, by a motor car, but such paper or like strip is not intended, as in other known devices, to provide the motorist with a tracing of the road or with a topographical plan, but its purpose is to impart to the motorists the informaion and advice which an expert when exploring the route in question has found to be useful or necessary to render motoring along such route absolutely safe and easy, this purpose being obtained by separately arranged texts of records which may be illuminated and may be read at a distance by all the occupants of the car. Records which may be impressed on the paper or like strip, are intended only to serve as a tourist guide to satisfy the curiosity of the travellers, and are therefore of a topographical, toponomastical, panoramical, historical and like nature.

Two other essential features of the new device are as follows:

The circuits of the lamps illuminating the records are closed in correspondence with the holes provided in the paper or like strip by means of birotatory contacts which ensure an absolute certainty of the lamps being alighted, and A perfect and continuous synchronism between the moving paper or like strip, and the road which the car is travelling, is obtained, no matter which is the diameter of the wheels of the car, by the aid of a device which permits to adjust the speed of the strip by means of a micrometer screw without the car having to be stopped.

The device is shown by way of example in the accompanying drawings, in which

Fig. 1 and Fig. 2 are respectively a section and an elevation of the entire device and Fig. 3 is a detail of the birotatory contacts.

In a housing 1 are mounted on shaft drums 2 and 3, a paper strip being caused to unwind from the drum 3 and to wind onto the drum 2 during the travel of the car. The paper strip moves along a series of birotatory contacts 5 and along an aperture 6 which is protected by a graduated glass so as to render the strip visible.

Rollers 7 and 8 rotate in contact one with the other and cause the strip 4 interposed between them to advance. The roller 7 has a rotary movement imparted to it through a gear from a disc 9 on which bears a wheel 10 which is connected through a flexible shaft 16 with the wheels of the car. The wheel 10 is pressed upward by a spring 11 and is held in place by a lever 12 on which it bears. The end 13 of the lever 12 is controlled by means of a screw 14. By screwing up or unscrewing the screw 14 the gear ratio between the wheel 10 and the disc 9 may be varied and in this way the speed of the paper strip may be adjusted at any moment so as to cause it to be always in perfect synchronism with the route that is being travelled.

An excentric lever 15 is provided to bring the wheel 10 out of contact with the disc 9 when the paper strip is to be stopped.

A battery of accumulators 17 feeds through conductors 18 lamps 19 arranged inside a housing 20, the circuit passing through the series of birotatory switches 5. The switches consist in a plurality of small rollers 5' which are pressed by springs 5" against a roller 21 (Fig. 3), the rollers 5' and 21 being caused to rotate by the sliding movement of the paper strip which passes between them.

The birotatory contacts close the respective circuits without fail even if there is an obstruction of any kind, as in the shape of small pieces of paper, between the rollers.

When a hole in the moving paper strip passes in front of the birotatory switches, the respective roller 5' closes together with the roller 21 the circuit of the lamp inside the housing 20 provided to illuminate the respective record 22, 22', 22''. . . . .

If the apparatus is applied to railway engines and the like, it may not only be used to inform the driver by means of the luminous signals of which action he has to take at the various points of line, but it may also be made to put automatically into action acoustical signals when the train approaches cross levels, stations and the like.

In order to reduce the breadth of the paper strip to a minimum it is preferable to arrange the birotatory contacts along two parallel lines, the distance from center to center of the holes being about three millimeters with a permissible difference of two tenths one way or the other.

What I claim is:

1. In a vehicle route indicating and guiding device having rotatable spools and an apertured indicating strip wound on said spools, a variable speed friction gear comprising a friction wheel displaceably mounted on a shaft and adapted to rotate at a speed depending upon the speed of the vehicle, a spring pressing upon said friction wheel and tending to move it axially in one direction along said shaft, a lever opposing such axial movement of said friction wheel, an adjusting screw for the micrometric displacement of said lever, a second friction wheel engaging with said displaceable friction wheel, and means for positively transmitting the movement of said second friction wheel to said spools.

2. A vehicle route indicating and guiding device comprising a variable speed friction gear, a spring, an adjusting lever associated with said spring for controlling the speed ratio of said gear, an eccentric lever for disengaging said gear at will, spools rotated by said friction gear, and an apertured indicating strip wound upon said spools.

3. A vehicle route indicating and guiding device comprising a variable speed friction gear, an eccentric lever for disengaging said gear at will, spools rotated by said friction gear, an apertured indicating strip wound on said spools, a number of electric switches each having the form of a pair of small rollers between which said strip is fed, small pistons each supporting one roller of a pair, springs for pressing said piston supported rollers towards the other rollers, means for adjusting the tension of said springs, and a single insulated support for said pistons and springs, the pistons being arranged in staggered relation in two parallel lines.

4. A vehicle route indicating and guiding device comprising a variable speed friction gear, an eccentric lever for disengaging said friction gear at will, spools rotated by said friction gear, an apertured indicating strip wound on said spools, a number of electric birotatory staggered switches mounted in a single support, a casing for said spools and strip, a separate casing for housing route signals, and electric connecting means leading from said switches for the purpose described.

In testimony whereof I have signed my name to this specification.

TOMMASO TALIANI.